United States Patent [19]

Mathews et al.

[11] 4,148,174
[45] Apr. 10, 1979

[54] FOLD-UP CROP VEGETATION CUTTING IMPLEMENT

[75] Inventors: Bernard C. Mathews; John A. Rogers, both of Crystal Lake, Ill.

[73] Assignee: Mathews Company, Crystal Lake, Ill.

[21] Appl. No.: 750,616

[22] Filed: Dec. 15, 1976

[51] Int. Cl.² .......................................... A01D 55/22
[52] U.S. Cl. ........................................ 56/12.7; 56/7; 56/504; 56/294
[58] Field of Search .................. 56/6, 7, 12.7, 15.9, 56/16.2, 294, 504

[56] References Cited

U.S. PATENT DOCUMENTS

| | | | |
|---|---|---|---|
| 2,682,740 | 7/1954 | Miller et al. | 56/6 |
| 3,034,274 | 5/1962 | Webb | 56/6 |
| 3,049,851 | 8/1962 | Hargreaves et al. | 56/7 |
| 3,115,738 | 12/1963 | Engler | 56/6 |
| 3,527,032 | 9/1970 | Wood | 56/6 |
| 3,646,733 | 3/1972 | Clapsaddle, Jr. | 56/7 |
| 3,650,096 | 3/1972 | Caldwell | 56/7 |
| 3,678,671 | 7/1972 | Scarnato et al. | 56/294 |
| 3,754,603 | 8/1973 | Bogie | 56/294 X |

*Primary Examiner*—Russell R. Kinsey
*Attorney, Agent, or Firm*—Burmeister, York, Palmatier, Hamby & Jones

[57] ABSTRACT

A flail type shredder for farm crops employing an elongated frame which is adapted to be mounted at the front end thereof on the three point hitch of a conventional farm tractor and which travels along the terrain supported by a pair of wheels mounted at the rear end of the frame which are adjustable with respect to the terrain to adjust the distance between the terrain and the frame. The chopper has a central elongated flail type crop severing unit mounted on and below the frame at the rear thereof and two elongated wing flail type crop severing units extending outwardly from opposite sides of the frame. The two wing units have housings open at the bottom and provided with a top, and each of these units is mounted on one of the side rails of the frame by a hinge located at the top of the unit, and each of the wing units is provided with a rotatable wheel adjustably mounted at the rear thereof to determine the distance between the terrain and each of the wing units separately. The machine is hydraulically controlled by means of the hydraulic system of the tractor to (1) control the elevation of the crop severing units with respect to the terrain, and, (2) to pivot the two wing units upwardly with respect to the ground to reduce the width of the implement to facilitate transport. Power for rotating the flail type severing units is derived from the tractor by a drive mechanism which permits pivotal movement of the wing units with respect to the frame of the implement.

15 Claims, 7 Drawing Figures

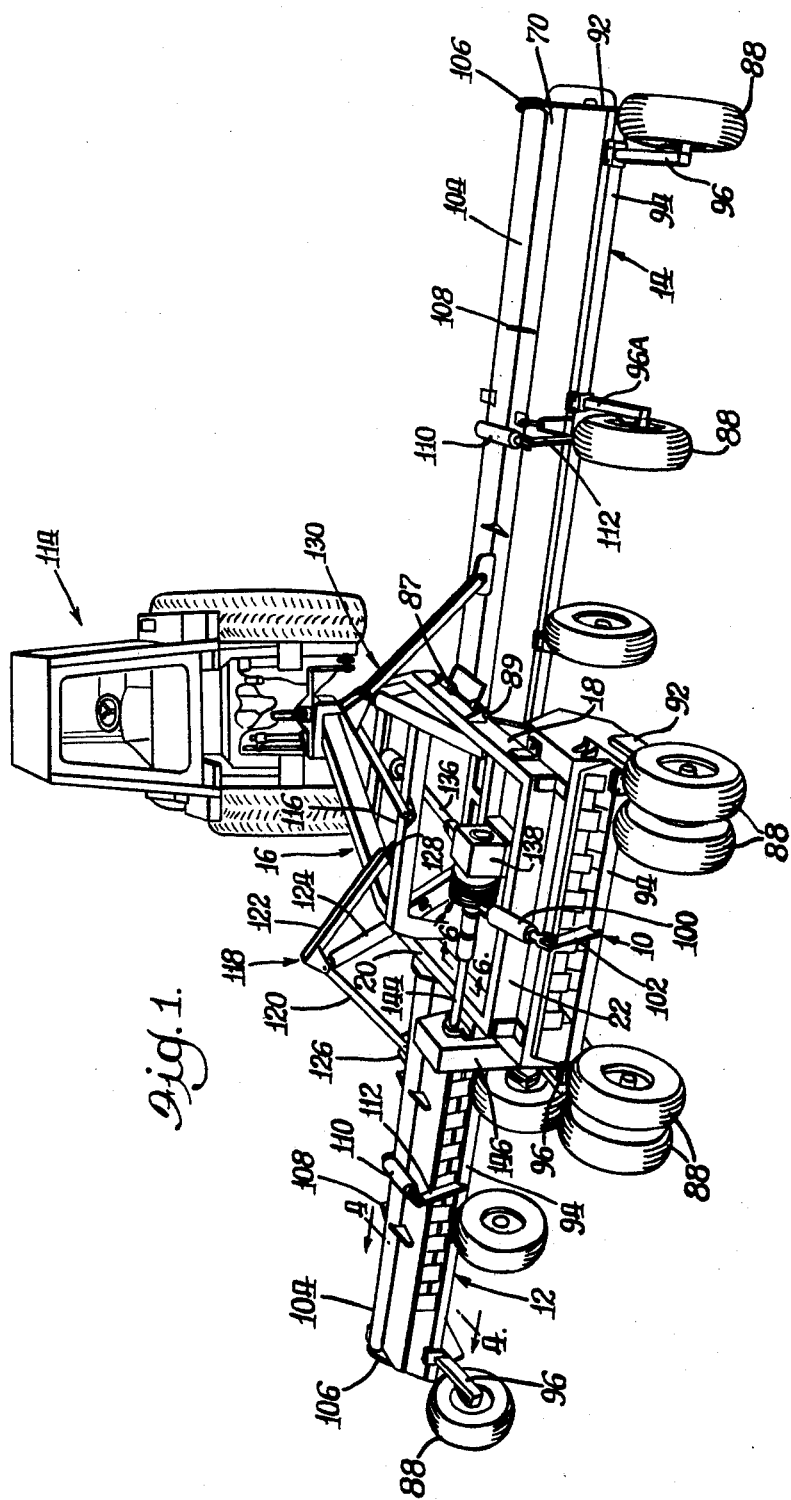
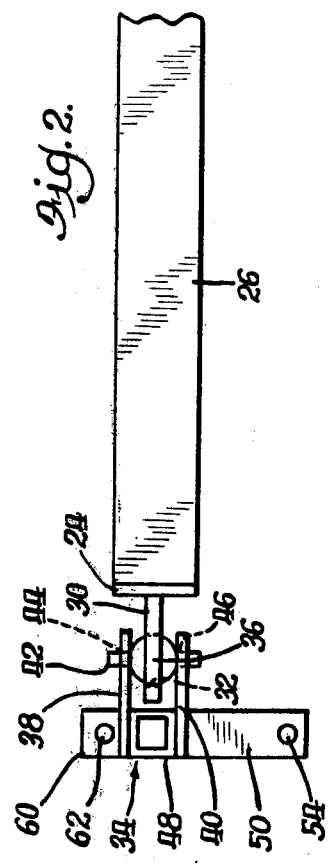

FOLD-UP CROP VEGETATION CUTTING IMPLEMENT

BACKGROUND OF THE INVENTION

The present invention relates to vegetation cutting devices and more particularly to farm implements used for cutting, mowing, shredding, or chopping plant growth.

Flail type farm implements have become available for use as shredders, mowers, choppers, and the like. Such implements are generally attached to a tractor and power is taken from the tractor for driving the flail cutters. U.S. Pat. No. 2,902,813 to Brady entitled VEGETATION CUTTING MEANS discloses a device for macerating undesired plant growth by means of a rotary blade. U.S. Pat. No. 2,888,795 to Lundell discloses a rotary device for chopping corn. U.S. Pat. Nos. 3,092,946 and 3,159,957 to Mathews describe a rotary scythe for hay and like crops for cutting the crop without chopping the vegetation. U.S. Pat. No. 3,159,958 to Mathews discloses a rotary chopper for hay and like crops. In such devices, a rotor is mounted within an elongated housing which is propelled by a tractor along an axis perpendicular to the housing, and the rotor is provided with blades which sever vegetation extending from the terrain over which the device moves.

SUMMARY OF THE INVENTION

It is one of the objects of the present invention to provide a rotary cutter for vegetation which is capable of cutting a wider swath than conventional rotary cutters, particularly an uninterrupted swath.

It is also an object of the present invention to provide an agricultural implement employing a rotary cutter which will follow rough terrain, particularly such a device which produces a continuous cut.

It is a further object of the present invention to provide an agricultural implement with a rotary cutter which will cut a wide swath and which will be folded up to facilitate movement of the implement from one location to another.

It is a further object of the present invention to provide an agricultural implement which employs a rotary cutter which will shred dry vegetation more completely than prior devices.

It is another object of the present invention to provide a shredder which can be utilized to cut only the upper portion of vegetation extending from the surface of a field, such as topping potatoes.

It is a further object of the present invention to provide an agricultural implement which may be drawn by a tractor having a plurality of hydraulic systems, and in which the implement will utilize two of those systems for controlling the height of cut and a third hydraulic system for folding the implement to facilitate transport of the implement.

While the present invention is illustrated herein as a shredder for processing vegetation to reduce it to sufficiently small particles to permit it to be turned under the ground readily, some features of the present invention may be utilized with mowers or choppers, or scythes.

The present invention utilizes the conventional three point hitch available on agricultural tractors. It is of course conventional to utilize the three point hitch of a tractor for attaching farm implements, U.S. Pat. No. 3,802,172 of Mathews entitled HITCH CONNECTION FOR A TRACTOR DRAWN IMPLEMENT being an example of such a construction. The present invention, however, utilizes the three point hitch in combination with apparatus to elevate the connection to the tractor as will be described hereinafter.

An agricultural implement constructed according to the present invention utilizes a plurality of crop severing or cutting units mounted on a frame, one of the units is mounted at the rear of the frame and below the frame, and another unit is mounted on the side of the frame by a hinge joint and extends outwardly from the frame. The frame is elongated, and carries a wheel at the rear thereof and a tongue at the front end thereof which is mounted on a yoke carried by the three point hitch of a tractor, and hence adjustment of the height of the three point hitch and the rear wheel of the frame controls the cutting height of the first unit. The second unit also is provided with a wheel rearwardly thereof which is adjustable with respect to the ground level to control the cutting height of this unit also. Each of the cutting units has a rotor assembly carrying blades for severing plant material, and power for rotating the rotor assemblies is derived from the power takeoff of the tractor through a power coupling means which utilizes a first shaft disposed below and journalled on the frame and a second shaft journalled on the frame normal to the first shaft and coupled to the first shaft. Power for the rotor assemblies of the first and second units is obtained from the second shaft.

Other objects, features and advantages of the present invention will become apparent from the following description.

DESCRIPTION OF DRAWINGS

FIG. 1 is an isometric view illustrating an agricultural implement constructed according to the teachings of the present invention;

FIG. 2 is a fragmentary sectional view of the hitch between the implement and the tractor illustrated in FIG. 4 is a sectional view taken along the line 4—4 of FIG. 1;

DESCRIPTION OF PREFERRED EMBODIMENT

Figure 3:
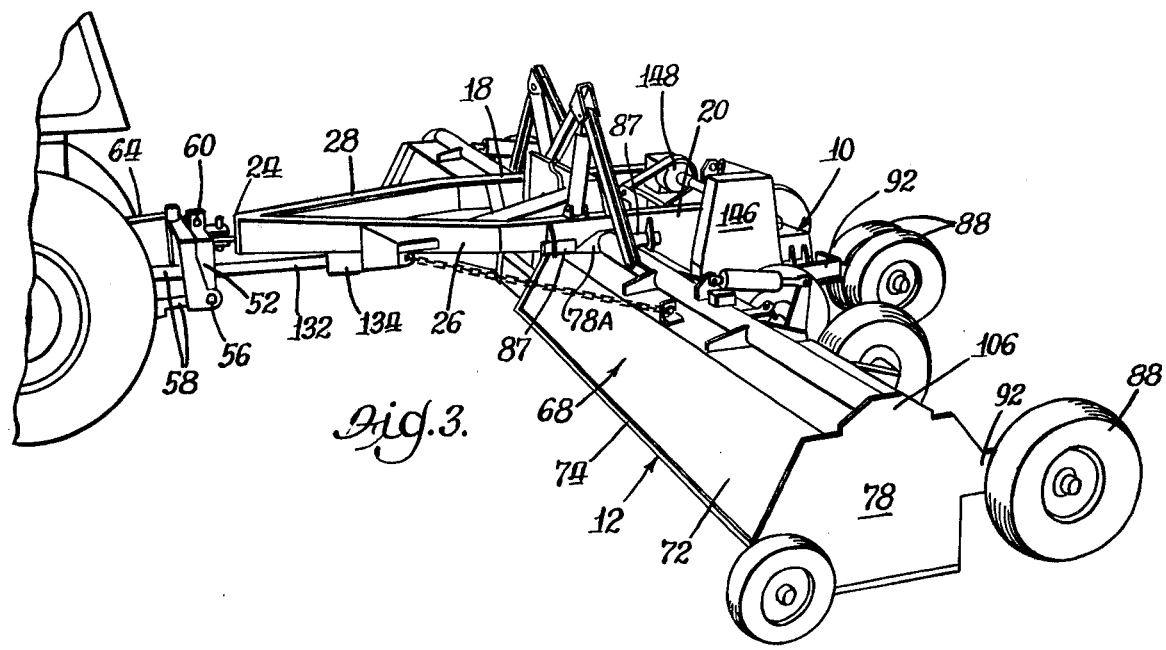

As illustrated, the agricultural machine has a central crop severing or cutting unit 10, and two wing crop severing units 12 and 14 disposed at opposite sides of the central unit 10. The central unit 10 is mounted on a frame 16 which has side rails 18 and 20 secured together by a rear rail 22. Frame 16 has a central axis extending from the rear rail 22 to a hitch plate 24. The side rails 18 and 20 are parallel to each other and disposed adjacent to the rear end of the frame, and a pair of converging forward rails 26 and 28 extend between the ends of the rails 18 and 20 and the hitch plate 24.

A tongue 30 extends forwardly from the frame 16 along the central axis of the frame 16 and is provided with a central aperture 32. A yoke 34 is mechanically coupled to the tongue 30 by means of a ball 36 rotatably disposed within the aperture 32 and mounted on a pair of arms 38 and 40 by means of a pin 42 anchored in confronting openings 44 and 46 in the arms 38 and 40, respectively. The yoke 34 has a cross leg 48 mounted between the arms 38 and 40 forwardly of the pin 42, and the yoke 34 has a pair of depending legs 50 and 52 secured to the cross leg 48 at opposite ends thereof. The depending legs 50 and 52 are provided with openings 54 adjacent to their ends remote from the cross leg 48 to accommodate pins 56 securing the end of the legs 50 and 52 on the two lower points 58 of the three point hitch of a tractor. A flange 60 extends upwardly from the central portion of the cross leg 48 and is provided with opening 62 to accommodate a mast 64 to mount the yoke 34 to the third point of the three point hitch of tractor. As is well known, the three point hitch of the tractor may be raised or lowered by the tractor operator by hydraulic circuits internal of the tractor.

Figure 4:
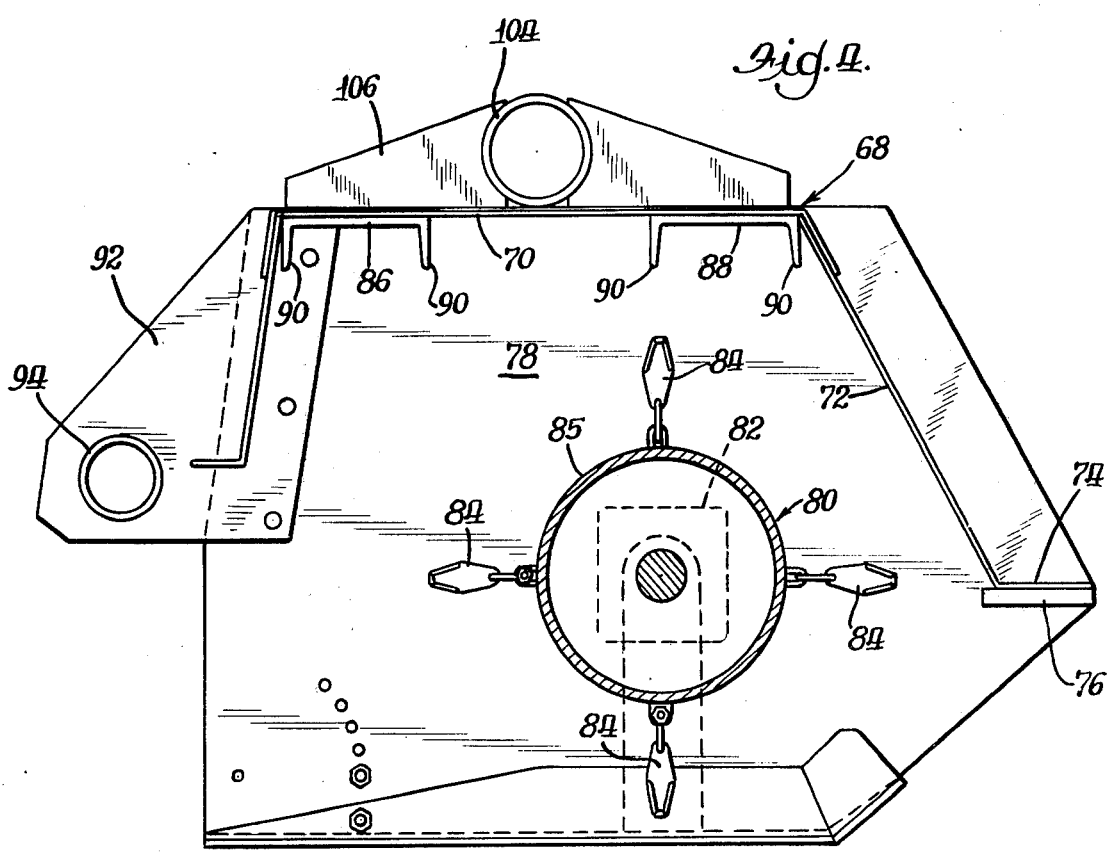

Each of the severing units 10, 12 and 14 has a housing 68 provided with a flat upper wall 70. The wall 70 of the central unit 10 is secured on and under the rearward portion of the side rails 18 and 20 and the rear rail 22 of the frame 16. The housing 68 of each of the severing units 10, 12 and 14 also has a front wall 72 which slopes forwardly from the edge of the top wall 70 and terminates in a flat lip 74 which supports a substantially horizontal cutting or shredding bar 76. The region below the bar 76 is open to permit plant materials to be shredded to enter into the housing 68. The housing 68 is provided with end walls 78 at opposite ends thereof, and a rotor assembly 80 is journaled on bearings 82 mounted in the end walls 78. The rotor assembly 80 carries a plurality of blades 84 mounted on a cylinder 85, and the rotor assembly rotates about its axis in a counter clockwise direction as viewed in FIG. 4 to cause material to be chopped to engage the blades 84 and the cutting bar 76.

The end wall 78A of the crop severing units 12 and 14 adjacent to the frame 16 carry one leaf of a pair of spaced hinges 87, the other leaf of the hinges 87 being mounted on the side rails 20 and 18 of the units 12 and 14 respectively. The leaves of the hinges 87 are rotatable on hinge pins 89 disposed coaxial and parallel to the longitudinal axis of the frame 16 and above the top wall 70 of the housing 68 of that crop severing unit.

Each of the crop severing units 10, 12 and 14 is provided with two channel members 86 and 88 mounted on the top wall 70 of the housing 68 parallel to the axis of the rotor assembly 80, and the channel members 86 and 88 have inwardly protruding edges 90 which extend into the housing 68. The edges 90 engage material being chopped by the blades 84 and further comminute that material, thus making it possible to operate the chopper with a cutting bar 76 further displaced from the blades 84 than prior constructions to achieve the same particle size, thus reducing the power requirement for the chopper.

A pair of support brackets 92 are mounted on opposite end walls 78 of the housing 68 and extend rearwardly of the severing unit 10, 12 or 14. A bar 94 is rotatedly mounted on the support brackets 92 and extends across the rearward side of each crop severing unit 10, 12 and 14. A pair of wheel brackets 96 are mounted at opposite ends of the bar 94 thereon, and each of the wheel brackets rotatably carries a wheel 88 at the ends thereof opposite the bar 94. Each of the wheel brackets 96 of the central unit 10 in the embodiment set forth in the figures carries a pair of wheels 88 on opposite sides thereof to carry the weight of the frame 16 and unit 10. The wing units 12 and 14 are provided with an additional wheel bracket 96A centrally of the other two brackets 96 and this bracket 96A also carries a wheel 88. A hydraulic cylinder 100 is mounted on the rear rail 22 of the frame 16, and the piston thereof is pivotally coupled on a lever arm 102, the opposite ends thereof being mounted on the bar 94 of the central unit 10. In this manner, the position of the piston within the cylinder 100 controls the angle of the wheel brackets 96 of the central unit 10 to the terrain, and therefore controls the height of the central crop severing unit 10 over the terrain.

The two wing crop severing units 12 and 14 are each provided with a stiffening tube 104 secured on the housing directly above the top wall 70 by means of flanges 106 extending upwardly from the end walls 78 and central flanges 108 mounted on the top wall 70 and secured on the tube 104. In the particular embodiment shown in the figures, two flanges 108 are disposed at equal intervals along the tube 104 of both of the wing crop severing units 12 and 14. A hydraulic cylinder 110 is mounted on the stabilizing tube 104 of each of the crop severing units 12 and 14, and the piston of the hydraulic cylinder 110 is connected through a lever arm 112 to the rotatable bar 94. In this manner, hydraulic pressure may be utilized in the cylinders 100 and 110 to adjust the height of the crop severing units 10, 12 and 14 with respect to the terrain.

FIG. 1 illustrates a tractor 114 of conventional design, and such tractors generally are provided with a plurality of hydraulic circuits which may be coupled to cylinders of implements drawn by the tractor. The present crop severing implement contemplates the use of three such hydraulic circuits, one of which will be used to control the hydraulic pressure within the cylinders 100 and 110. In this manner, the rearward portion of the crop severing units is controlled with respect to the ground level. A second hydraulic circuit of the tractor 114 is utilized to elevate and lower the three point hitch of the tractor, thereby adjusting the forward end of the frame 16 and leveling the crop severing units 10, 12 and 14. Each of the wing crop severing units 12 and 14 is controlled as to elevation by the hinges 87 which mount the unit on the frame 16 at the frame end of the units, and the opposite end of the units from the frame 16 is controlled with respect to elevation from the ground by rotatable bar 94, wheel brackets 96 and wheels 98.

Figure 5:
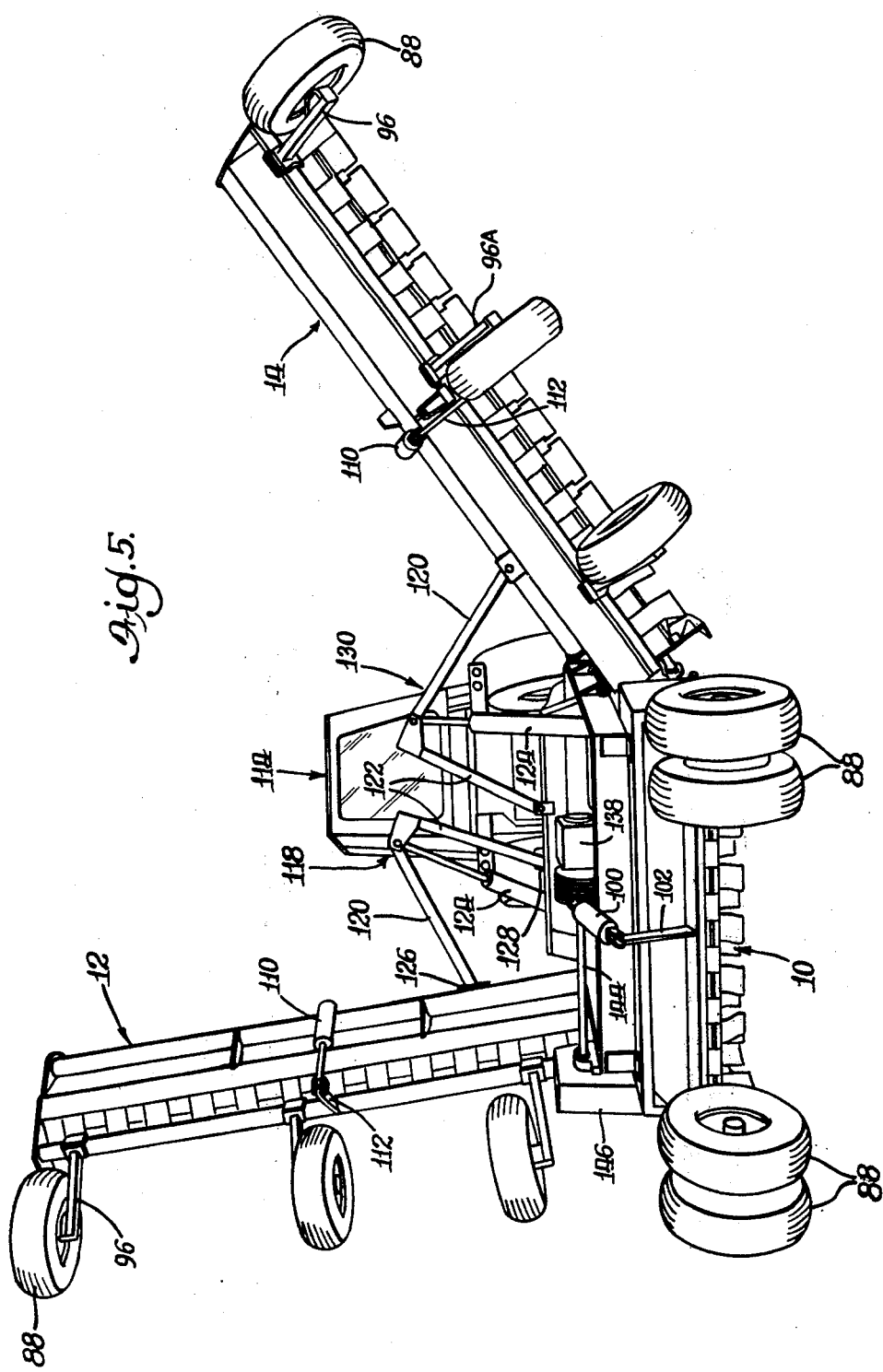
FIG. 5 is a rear isometric view illustrating the operation of the agricultural implement.
Figure 6:
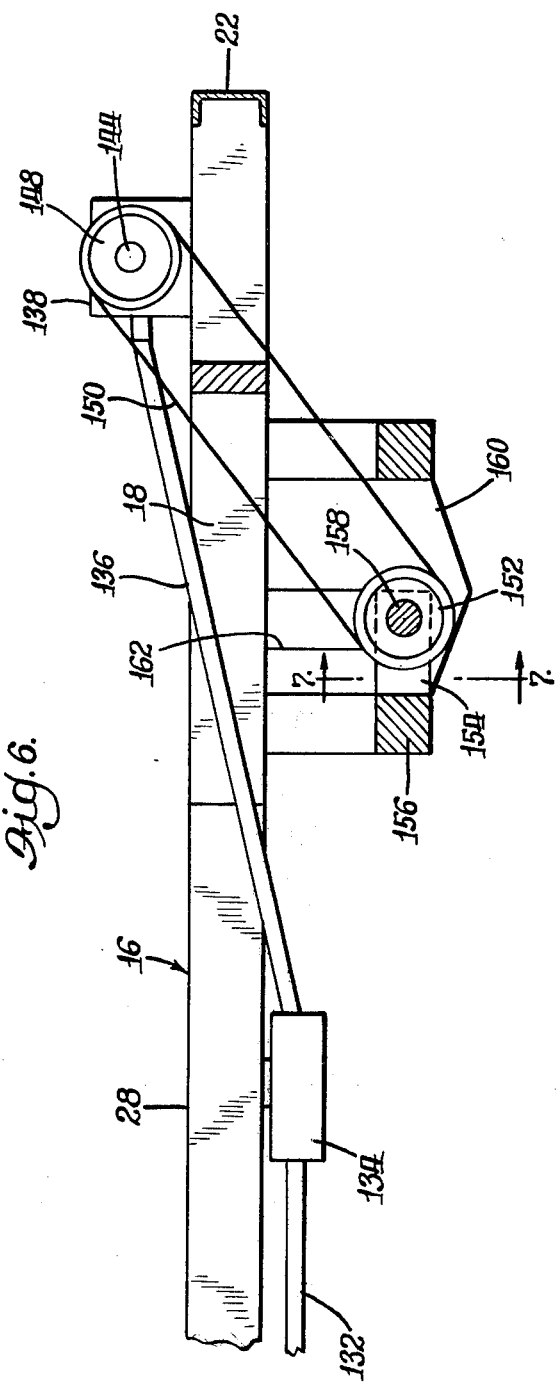
FIG. 6 is a fragmentary sectional view taken along the line 6—6 of FIG. 1.

The frame 16 is provided with a cross member 116 which extends between the side rails 18 and 20 in substantial alignment with the longitudinal axis of the wing crop severing units 12 and 14, the cross member 116 being disposed slightly above the plane of the side rails 18 and 20. A hydraulic jack mechanism 118 is mounted between the cross member 116 and the wing unit 12 and comprises two pivotally interconnected arms 120 and 122 and a hydraulic cylinder 124. The first arm 120 of the hydraulic jack mechanism 118 is mounted pivotally at one end on a bracket 126 protruding from the top 70 of the housing 68 of the wing crop severing unit 12, the other end of the arm 120 being pivotally mounted on the second arm 122. The end of the arm 122 opposite the arm 120 is pivotally mounted by means of a bracket 128 on the cross member 116 of the frame 60. The hydraulic cylinder 124 is mounted pivotally on the side rail 20 of the frame 16 adjacent to the cross member 116, and the hydraulic cylinder 124 has a piston which is pivotally connected to the first arm 120 at the pivotal junction thereof with the second arm 122. The hydraulic cylinder 124 is connected to the third hydraulic circuit of the tractor 114, and when actuated the hydraulic cylinder forces the pivot point between the arms 120 and 122 outwardly of the frame, thus pivoting the crop severing unit 12 on its hinges 87 to elevate the wheels 88 of the crop severing unit 12 from the ground and cause the housing 68 thereof to assume a substantially vertical position, as illustrated in FIG. 5.

A second hydraulic jack mechanism 130 is mounted between the frame 16 and the crop severing unit 14. The second hydraulic jack mechanism also employs arms 120 and 122 and a hydraulic cylinder 124 identical to that described in connection with the first hydraulic jack mechanism 118. The hydraulic cylinder 124 of the second hydraulic jack mechanism 130 is coupled to a fourth hydraulic circuit of the tractor 114 to permit the wing crop severing unit 14 to be raised separately from the wing crop severing unit 12. As illustrated in FIG. 5, the wing crop severing unit 12 has been elevated to substantially its full elevation, and the wing crop severing unit 14 is in the process of being elevated. It will be recognized that with both wing crop severing units 12 and 14 elevated, the entire weight of the crop severing implement rests upon the four wheels 88 of the crop severing unit 10.

Power to rotate the rotor assemblies 80 of the crop severing units 10, 12 and 14 is derived from the power takeoff of the tractor 114. A drive shaft 132 is connected at one end to the power takeoff and extends to a universal joint 134 mounted on the converging portions 26 of the frame 16 in order to accommodate misalignment of other elements of the drive system of the implement with the power takeoff of the tractor and to permit the elevation of the frame 16 to be changed by positioning of the three point hitch of the tractor. A second shaft 136 extends from the universal joint 134 to a gear box 138. The gear box 138 is mounted on a cross member 140 and bracket 142 of the frame adjacent to the rearward rail 22 thereof. The gear box 138 has an output shaft 144 connected to a drive unit 146 for the central crop severing unit 10. The drive unit 146 is mounted on the end wall 78 of the crop severing unit 10 adjacent to the side rail 20, and is connected to the rotor assembly 80 of the crop severing unit 10 to propel the rotor cylinder 85.

The shaft 144 from the gear box 138 also carries a pulley 148, and a belt 150 disposed about the pulley 148 engages a second pulley 152. The second pulley 152 is journaled on a pair of plates 154 which extend normal to the axis of the pulley 152 from a supporting beam 156 mounted on the side rails 18 and 20 and disposed beneath the side rails. The pulley 152 carries a shaft 158 which extends outwardly and is aligned with the rotor cylinder 85 of the rotor assemblies of the crop severing units 12 and 14 when said severing units are positioned on the surface of the earth. End plates 160 are disposed adjacent to the side rails 18 and 20 and are provided with apertures 162 in alignment with the shaft 158.

Figure 7:
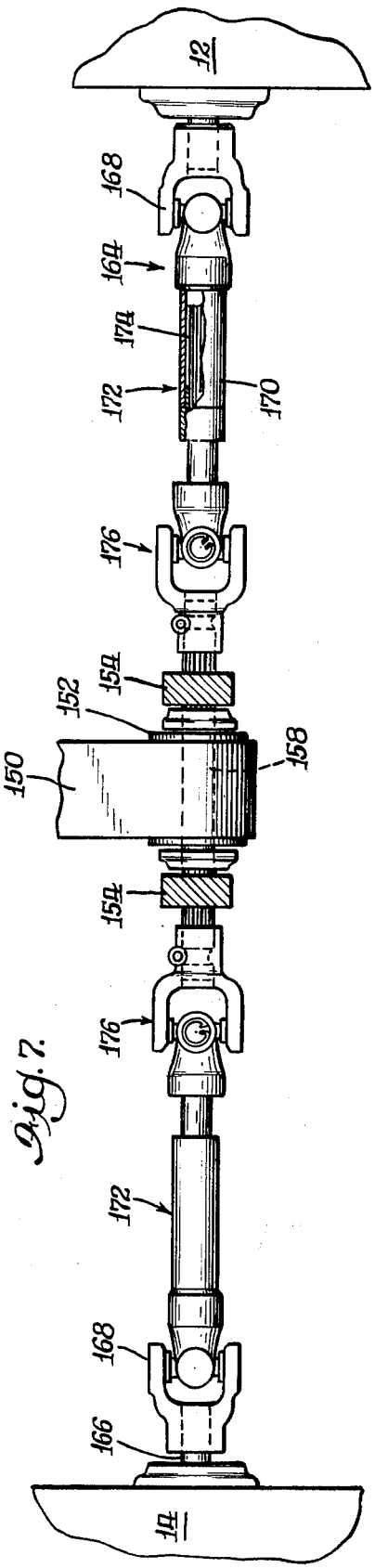
FIG. 7 is a fragmentary sectional view taken along the line 7—7 of FIG. 6.

FIG. 7 illustrates the drive mechanism between the pulley 152 and the rotor assemblies 80 of the crop severing units 12 and 14. The shaft 158 is connected to one end of an extendable coupler 164, and the other end of the extendable coupler is connected to a drive shaft 166 of the rotor assembly 80 of the crop severing unit 14. The extendable coupler 164 has a universal joint 168 at one end securely attached to the shaft 158 of the pulley 152, and the universal joint 168 is connected to the outer sleeve 170 of a telescoping assembly 172. The inner surface of the sleeve 170 is splined, and a splined shaft 174 is disposed within the sleeve 170 and translatable therein. The sleeve 170 is provided with a lubricant to facilitate translation of the shaft therein. The splined shaft 174 is connected at its end to a second universal joint 176, and universal joint 176 is connected to the shaft 166.

As the crop severing unit 14 pivots on its hinges with respect to the frame 16, the splined shaft 174 will be translated within the sleeve 170 of the telescoping coupler 172, thereby maintaining coupling to the pulley 152. When the crop severing unit 14 is pivoted into a substantially vertical position for transport, the splined shaft 174 will slide free from the splined sleeve 170. A crop severing unit in a substantially vertical position as the crop severing unit 12 shown, in FIG. 5, may be returned to ground level under the control of the hydraulic system, but the splined shaft 174 must be realigned manually with the splined sleeve 170.

The pulley shaft 158 and the pulley 152 are coupled to the crop severing unit 12 by means of an extendable coupler 164 as described above. The extendable couplers permit the crop severing unit 12 and the crop severing unit 14 to follow rough terrain without strain on the mechanical drive units. Further, the central crop severing unit 10 is disposed behind the wing crop severing units and extends beyond the side rails 18 and 20 of the frame 60 in order to cover the entire region between the wing crop severing units 12 and 14, thereby avoiding gaps between the crop severing units.

In one particular construction, the crop severing implement is provided with blades 84 designed to chop or shred plant material, such as corn stubble, in order to break it up into small particles to facilitate plowing. The implement shreds a span of thirty feet at a single pass, the central unit 10 having an axial length of seven feet and the crop severing units 12 and 14 having axial length of twelve feet, a six inch overlap being provided between the crop severing unit 10 and the adjacent crop severing unit 12 or 14.

The present invention may be utilized for other types of implements than shredders including mowers, choppers, and scythes. Those skilled in the art will find uses for the present invention in addition to those herein disclosed, and it is intended that the scope of the present invention be not limited by the foregoing specification, but rather only by the following claims.

The invention claimed is:

1. An agricultural machine adapted to be drawn in a field in an intended direction of travel by a tractor having a rear hitch and a rear power takeoff comprising, in combination: a frame having a rear end and a front end aligned with the intended direction of travel,; means for coupling the front end of the frame on the rear hitch of the tractor; a first wheel; means for rotatably mounting the first wheel on and extending below the frame at the rear end thereof for supporting the frame, said first wheel being aligned with the intended direction of travel and said mounting means including means for adjusting the distance the first wheel extends below the frame; a first crop severing unit for processing plant material on the field mounted on and below the frame at the rear end thereof, said first unit having a rotatable blade and a power input shaft extending generally normal to the intended direction of travel; a second crop severing unit for processing plant material extending from the field having opposite ends, said second unit having a rotatable blade and being pivotally mounted at one end on the frame forwardly of the first unit on an axis generally parallel to the intended direction of travel, and said second crop severing unit extending outwardly from the frame, said second unit having a power input shaft parallel to the power input shaft of the first unit; a second wheel; means for rotatably mounting the second wheel on and extending below the second unit outwardly from the frame and parallel to the first wheel for supporting the second unit including means for adjusting the distance the second wheel extends below the second unit; and power coupling means having a first shaft rotatably mounted on and below the frame having an end adapted to engage the tractor power takeoff, said power coupling means having a second shaft rotatably mounted on the frame generally parallel and adjacent to the rear end of the frame, said power coupling means including a gear box mounted on the frame having a rotatable input member connected to the first shaft and an output member rotatable on an axis aligned with and connected to the second shaft, means to couple the second shaft to the power input shaft of the first unit, and means to couple the second shaft to the power input shaft of the second unit.

2. An agricultural machine adapted to be drawn along a field by a tractor having a rear three point hitch and a rear power takeoff comprising the combination of claim 1 wherein the frame has a tongue extending outwardly from the front end thereof, said tongue having an aperture therethrough, and the means for coupling the front end of the frame on the rear hitch of the tractor comprises a yoke having a center leg and a pair of legs extending from opposite ends of the center leg parallel to each other, the end of each of the legs of the pair opposite the center leg being adapted to be connected to one of the three points of the hitch, means mounted on a central portion of the center leg adapted to be connected to the third point of the three point hitch, said yoke having a pair of spaced plates extending therefrom and disposed generally parallel to and on opposite sides of the tongue of the frame, said plates having aligned orifices extending therethrough and aligned with the aperture in the tongue, and a coupling pin extending through the orifices and aperture.

3. An agricultural machine comprising the combination of claim 2 wherein the pin is provided with an enlarged spherical portion rotatably disposed within the aperture of the tongue.

4. An agricultural machine comprising the combination of claim 1 in combination with actuable and deactuable means mounted on the frame and connected to the second unit for pivoting the second unit on its pivotal axis to raise the second unit from the field.

5. An agricultural machine comprising the combination of claim 1 wherein the first and second crop severing units each comprise a rotor assembly having a rotatable shaft mounted generally normal to the pivotal axis of the second unit and including spaced ends and crop severing blades disposed between the ends, a housing for said rotor assembly having a top wall, a front wall and a back wall, the front wall and back wall extending downwardly from the edges of the top wall confronting the front end and rear end of the frame respectively, said housing having end walls at opposite ends of the housing and being open at the bottom, each of said end walls carrying a bearing and opposite ends of the rotor assembly being journalled in said bearings.

6. An agricultural machine comprising the combination of claim 5 wherein the frame has a rail parallel to the pivotal axis of the second unit and the second unit is pivotally mounted on the rail by a hinge having a first leaf mounted on said one end of the second unit and a second leaf mounted on the rail, the pivotal axis being disposed adjacent to the top wall of the second unit.

7. An agricultural machine comprising the combination of claim 5 wherein the top wall is substantially flat and is provided with a channel member disposed parallel to the rotor shaft, said channel member having a flat central portion and parallel edges extending therefrom, the edges of the channel member extending toward the blades, and the blades being adapted to propel plant material against the edges of the channel member.

8. An agricultural machine comprising the combination of claim 7 wherein two channel members are mounted on the top wall parallel to the rotor shaft, one channel member being disposed adjacent to the front wall and the other channel member being disposed adjacent to the back wall of the housing, and the rotor assembly being adapted to move the blades thereof in a path entering the housing from the open side thereof adjacent to the front wall and leaving the housing at the open side thereof adjacent to the rear wall.

9. An agricultural machine comprising the combination of claim 5 wherein the frame is provided with a second rail generally parallel to and spaced from the first rail, in combination with a third crop severing unit having a rotor assembly with a rotatable shaft mounted generally normal to the second rail and including spaced ends and crop severing blades disposed between the ends, said third unit having a housing for said rotor assembly having a top wall, a front wall and a back wall, the front wall extending downwardly from the edge of the top wall confronting the front end of the frame, said housing having end walls at opposite ends thereof and being open at the bottom, each of said end walls carrying a bearing and opposite ends of the rotor shaft being journalled in said bearings, said third unit being pivotally mounted at one end on the second rail of the frame forwardly of the first unit on an axis generally parallel to the pivotal axis of the second unit and extending outwardly from the second rail and away from the first rail, a third wheel, means for rotatably mounting the third wheel on and extending below the third unit outwardly from the second rail and parallel to the first wheel for supporting the third unit including means for adjusting the distance the third wheel extends below the third unit, a power input shaft rotatably mounted on said housing of the third unit and coupled to the rotor assembly of the third unit, and means to couple the second shaft of the power coupling means to the power input shaft of the third unit.

10. An agricultural machine comprising the combination of claim 9 wherein the first wheel is disposed rearwardly of the second and third wheels with respect to the frame.

11. An agricultural machine comprising the combination of claim 6 in combination with a fourth wheel, and means for rotatably mounting the fourth wheel on the other end of the second unit and extending below said unit, said wheel being disposed adjacent to the front wall of the housing of the second unit and parallel to the first wheel.

12. An agricultural machine comprising the combination of claim 6 in combination with a first arm pivotally mounted at one end on the frame, a second arm pivotally mounted at one end on the other end of the first arm and pivotally mounted at the other end on the top wall of the housing of the second unit, the first and second arms being in a plane normal to the pivotal mounting axis of the second unit on the frame and disposed at an angle to each other, and a hydraulic cylinder mounted between the frame and the one end of the second arm.

13. An agricultural machine comprising the combination of claim 12 wherein the means to couple the second shaft to the power input shaft of the second unit includes a telescoping splined coupler.

14. An agricultural machine comprising the combination of claim 9 wherein the power input shaft of the second unit is aligned with the power input shaft of the third unit and the means to couple the second shaft of the power coupling means to the power input shaft of the second unit and the power input shaft of the third unit comprises means interconnecting the power input shaft of the second unit and the power input shaft of the third unit including an elongated shaft coupler having a first part slidably engaging a second part and a universal joint, the first part of the shaft coupler sliding with respect to the second part thereof to change the length of the elongated shaft coupler.

15. An agricultural machine comprising the combination of claim 9 wherein the power input shaft of the second unit is aligned with the power input shaft of the third unit and the means to couple the second shaft of the power coupling means to the power input shaft of the second unit and the power input shaft of the third unit comprises a first pulley mounted for rotation on the frame between the second unit and the third unit and aligned with the power input shafts thereof, a first universal joint and a first elongated shaft coupler connected to each other and between the power input shaft of the second unit and the first pulley, a second universal joint and a second elongated shaft coupler connected to each other and between the power input shaft of the third unit and the first pulley, the first and second shaft couplers having two splined mating parts slidable with respect to each other to change the length of the shaft coupler and the two parts becoming disengaged when the shaft coupler is lengthened beyond a fixed length, a second pulley mounted on the second shaft of the power coupling means, and a belt mounted on the first and second pulleys.

* * * * *

UNITED STATES PATENT OFFICE
CERTIFICATE OF CORRECTION

Patent No. 4,148,174　　　　　　　　　Dated April 10, 1979

Inventor(s)　　Bernard C. Mathews, John A. Rogers

It is certified that error appears in the above-identified patent and that said Letters Patent are hereby corrected as shown below:

Column 2, line 38 after "illustrated in" insert -- Fig. 1.

Fig. 3 is a forward isometric view of the agricultural implement of Figures 1 and 2; --

Signed and Sealed this

Twenty-fifth Day of September 1979

[SEAL]

*Attest:*

*Attesting Officer*

LUTRELLE F. PARKER
*Acting Commissioner of Patents and Trademarks*